United States Patent [19]
LeGrand et al.

[11] Patent Number: 6,140,457
[45] Date of Patent: Oct. 31, 2000

[54] STATIC-RESISTANT POLYCARBONATES HAVING DI-T-ALKYLPHENYL END GROUPS

[75] Inventors: Donald George LeGrand, Burnt Hills; Patrick Joseph McCloskey, Watervliet, both of N.Y.

[73] Assignee: General Electric Company, Schenectady, N.Y.

[21] Appl. No.: 09/259,646

[22] Filed: Feb. 26, 1999

[51] Int. Cl.⁷ .................................................. C08G 64/00
[52] U.S. Cl. .................................................. 528/196
[58] Field of Search ............................................. 528/196

[56] References Cited

U.S. PATENT DOCUMENTS

| | | | |
|---|---|---|---|
| 4,806,571 | 2/1989 | Knobel et al. | 521/107 |
| 4,927,553 | 5/1990 | Wright et al. | 508/200 |
| 4,939,204 | 7/1990 | Efford | 524/701 |
| 5,025,922 | 6/1991 | Havens et al. | 206/328 |
| 5,122,558 | 6/1992 | Knobel et al. | 524/165 |

*Primary Examiner*—Terressa M. Boykin
*Attorney, Agent, or Firm*—Noreen C. Johnson; Douglas E. Stoner

[57] ABSTRACT

Polycarbonates, such as bisphenol A polycarbonates, having end groups derived from a di-t-alkylphenol such as 3,5-di-t-butylphenol have very low electrostatic charges. They are thus useful in applications where static charge is a problem, such as automotive headlamps and optical data recording media.

25 Claims, No Drawings

STATIC-RESISTANT POLYCARBONATES HAVING DI-T-ALKYLPHENYL END GROUPS

BACKGROUND OF THE INVENTION

This invention relates to polycarbonates, and more particularly to polycarbonates having high resistance to the development of static charge.

Polycarbonates, especially aromatic polycarbonates, are routinely used in structural applications, for example, in the form of transparent sheet material as replacements for glass. They are also the common materials for the fabrication of optical data recording media, including optical disks as exemplified by compact audio disks and CD-ROM disks used in computers Many polycarbonates have a tendency to accumulate charges of static electricity, which can be a problem in such applications. The problematic nature of static charges is apparent in data recording media. It also exists, however, in automotive parts such as body panels and headlamp lenses. For example, such parts are often subjected to electrostatic powder coating procedures as a substitute for painting, and such procedures are seriously complicated by static charges.

It is of interest, therefore, to develop polycarbonates having high resistance to the development of charges of static electricity.

SUMMARY OF THE INVENTION

The present invention is directed to polycarbonates having novel end groups, said polycarbonates being characterized by a very low tendency to accumulate static charges. In other respects, these polycarbonates have advantageous physical and chemical properties characteristic of polycarbonates as a genus, and responsible for their use as engineering thermoplastics.

One aspect of the invention, therefore, is polycarbonates having di-t-alkylphenyl end groups.

Another aspect is polycarbonates having di-t-alkylphenyl end groups of the formula

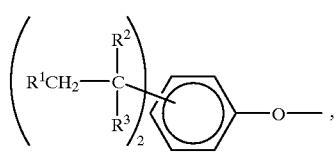

(I)

wherein each $R^1$ is hydrogen or a $C_{1-3}$ primary alkyl radical, and each of $R^2$ and $R^3$ is independently a $C_{1-4}$ primary alkyl radical.

Still other aspects are articles of manufacture comprising such polycarbonates, including optical data recording media and transparent objects as exemplified by automotive headlamp lenses.

Still another aspect of the invention is a method for modifying the tendency of polycarbonate to accumulate static charges which comprises capping the polycarbonate with di-t-alkylphenyl end groups.

DETAILED DESCRIPTION; PREFERRED EMBODIMENTS

The polycarbonates of this invention include homo- and copolycarbonates, generally comprising structural units of the formula

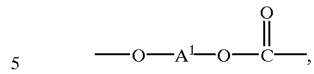

(II)

wherein at least about 60% of the total number of $A^1$ groups are aromatic organic radicals and the balance thereof are aliphatic, alicyclic, or aromatic radicals. Preferably, each $A^1$ is an aromatic organic radical and more preferably a radical of the formula

(III)

wherein each of $A^2$ and $A^3$ is a monocyclic divalent aryl radical and Y is a bridging radical in which one or two atoms separate $A^2$ and $A^3$. The free valence bonds in formula III are usually in the meta or para positions of $A^2$ and $A^3$ in relation to Y.

In formula III, the $A^2$ and $A^3$ values may be unsubstituted phenylene or substituted derivatives thereof. Unsubstituted phenylene radicals are preferred. Both $A^2$ and $A^3$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated $C_{1-12}$ aliphatic or alicyclic radical such as methylene, cyclohexylmethylene, [2.2.1]bicycloheptyl-methylene, ethylene, ethylidene, isopropylidene, cyclohexylidene, cyclopentadecylidene, cyclododecylidene or 2,2-adamantylidene, especially an alkylidene radical. Aryl-substituted radicals are included, as are unsaturated radicals and radicals containing atoms other than carbon and hydrogen; e.g., oxy groups. Substituents such as those previously enumerated may be present on the aliphatic, alicyclic and aromatic portions of the Y group.

Dihydroxy compounds corresponding to radicals of formula III are classed as bisphenols. Illustrative bisphenols and other dihydroxyaromatic compounds for use in the invention are listed in U.S. Pat. No. 4,737,573, the disclosure of which is incorporated by reference herein. For the sake of brevity, the term "bisphenol" will frequently be employed hereinafter, but it should be understood that other dihydroxyaromatic compounds may be substituted for all or part of the bisphenol when appropriate. Bisphenol A, in which Y is isopropylidene and A2 and $A^3$ are each p-phenylene, is especially preferred for reasons of availability and particular suitability for the purposes of the invention.

A crucial aspect of the invention is the structure of the polycarbonate end groups. They are derived from a di-t-alkylphenol. Illustrative end groups are those of formula 1, in which the $R^1$ value is hydrogen or $C_{1-3}$ primary alkyl, and the $R^{2-3}$ values are $C_{1-4}$ primary alkyl. Most often, $R^1$ is hydrogen and each of $R^2$ and $R^3$ is methyl. The t-alkyl groups may be in any position on the aromatic ring. Illustrative di-t-alkylphenols are 2,4-di-t-butylphenol and 3,5-di-t-butylphenol, with the latter often being preferred by reason of its particular effectiveness for antistatic purposes.

The polycarbonates of the invention are conveniently prepared by a conventional interfacial reaction of phosgene with at least one dihydroxyorganic compound, in which the di-t-alkylphenol is employed as a chain termination agent. The conditions of such reactions are well known in the art; they include the use of a mixture of water and a water-immiscible organic liquid such as methylene chloride as a reaction medium; the presence of a tertiary amine such as triethylamine or a phase transfer catalyst such as tetra-n-butylammonium chloride or hexaethylguanidinium chloride; and the presence of an alkaline reagent such as sodium hydroxide as an acid acceptor. Typical proportions of chain termination agent are in the range of about 1–10 mole percent based on dihydroxyorganic compound. Interfacial reactions to prepare polycarbonates may involve the intermediacy of bischloroformates as described, for example, in U.S. Pat. No. 4,737,573, which is incorporated herein by reference.

Polycarbonates of the invention may also be prepared by other methods. For example, the di-t-alkylphenol may be converted to the corresponding carbonate which may undergo reaction with a polycarbonate prepared by transesterification (for example, by the melt reaction of a dihydroxyorganic compound with a diaryl carbonate) or with the precursors thereof. Polycarbonates may also be modified and end-capped by redistribution processes as described, for example, in U.S. Pat. No. 5,414,057, which is incorporated herein by reference.

The di-t-alkylphenols employed as chain termination agents may be prepared by an electrophilic aromatic substitution reaction of an olefin of the formula

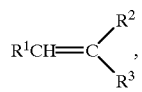

wherein $R^{1-3}$ are as previously defined, with a hydroxyaromatic compound, preferably phenol. The product is typically a mixture rich in 2,4- and 3,5-t-alkylphenols which may be separated into the individual isomers by art-recognized procedures. 3,5-Di-t-butylphenol (hereinafter sometimes "35DTBP") is commercially available from Aldrich Chemical Co.

Molded parts and sheet products may be prepared from the polycarbonates of this invention by conventional methods. These may include injection molding, compression molding and extrusion. The polycarbonates may be admixed with various commonly known and used additives such as antioxidants; auxiliary antistatic agents; inert fillers such as glass, talc, mica, and clay; ultraviolet radiation absorbers such as the benzophenones and benzotriazoles; hydrolytic stabilizers such as the epoxides disclosed in U.S. Pat. Nos. 3,489,716, 3,839,247, and 4,138,379 all of which are incorporated herein by reference; color stabilizers such as the organophosphites; thermal stabilizers such as phosphites; flame retardants; and mold release agents.

The invention is illustrated by the following examples.

EXAMPLE 1

A 30 liter glass vessel was charged with 12 liters of methylene chloride, 7 liters of deionized water, 1824 grams (g) (8 moles) of bisphenol A, 66 g (320 mmol) of 35DTBP and 15 milliliters (ml) (108 mmol) of triethylamine. In a nitrogen atmosphere, the mixture was stirred, and phosgene was passed into it at 15 g/min to a total of 935 g (9.44 moles), with addition of sodium hydroxide to maintain a pH in the range of 10–11. Stirring was continued until all the phosgene had been consumed, after which the aqueous phase was separated and the organic phase was washed with dilute aqueous hydrochloric acid and three times with deionized water. The desired 35DTBP-terminated polycarbonate was isolated by precipitation into methanol, collected and dried in vacuum under nitrogen at 110° C.

EXAMPLE 2

Physical properties were measured for a 35DTBP-terminated polycarbonate similar to that of Example 1 and for several bisphenol A polycarbonates of comparable molecular weight, said polycarbonates being prepared by conventional methods (including three different ones prepared interfacially) and containing effective amounts of conventional antistatic-mold release agents. Among the properties measured were electrostatic charge using a Meech field meter on plaques for the falling dart (Dynatup) impact strength test (ASTM method D3763) immediately after molding, and surface refractive index, using a Bausch & Lomb Abbe refractometer and a silicone contact fluid, both at room temperature. The results are given in the following table.

| Preparation method | Chain termination agent | Glass transition temp., ° C. | Density, g/cc | Surface refractive index | Electrostatic charge, Volts |
| --- | --- | --- | --- | --- | --- |
| Interfacial | 35DTBP | 148 | 1.183 | 1.5814 | 100 |
| Interfacial | PCP* | 145 | 1.184 | 1.5829 | 200 |
| Interfacial | PCP | 140 | 1.190 | 1.5858 | 400 |
| Bischloroformate | PCP | 140 | 1.190 | 1.5859 | 400 |
| Transesterification | None | 140 | 1.190 | 1.5858 | −1,200 |
| Redistribution | PCP | 140 | 1.190 | 1.5855 | 500 |

*p-Cumylphenol.

As demonstrated in the table, all polycarbonates were essentially similar in glass transition temperature, density and refractive index. Those prepared by methods other than transesterification had positive electrostatic charge values, while the corresponding value for the transesterification product was negative; however, it is the absolute values of these numbers that are significant. In that regard, the product of the invention had a significantly lower electrostatic charge than any comparative product. This is true despite the fact that the comparative products contained conventional anti-static agents while the product of the invention did not.

What is claimed is:

1. A method for modifying the tendency of polycarbonate to accumulate static charges which comprises capping the polycarbonate with end groups of the formula

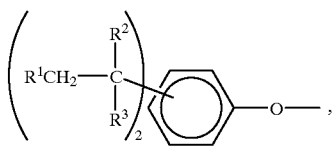

wherein each $R^1$ is hydrogen or a $C_{1-3}$ primary alkyl radical, and each of $R^2$ and $R^3$ is independently a $C_{1-4}$ primary alkyl radical.

2. The method according to claim 1 in which the polycarbonate comprises structural units of the formula

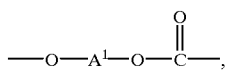

wherein at least about 60% of the total number of $A^1$ groups are aromatic organic radicals and the balance thereof are aliphatic, alicyclic, or aromatic radicals.

3. The method according to claim 2 wherein $A^1$ has the formula $$—A^2—Y—A^3—, \quad (III)$$

wherein each of $A^2$ and $A^3$ is a monocyclic divalent aryl radical and Y is a bridging radical in which one or two atoms separate $A^2$ and $A^3$.

4. The method according to claim 3 wherein each of $A^2$ and $A^3$ is p-phenylene and Y is isopropylidene.

5. The method according to claim 1 wherein $R^1$ is hydrogen and each of $R^2$ and $R^3$ is methyl.

6. The method according to claim 5 wherein the t-alkyl groups are in the 3- and 5-positions.

7. A method for reducing the tendency of a molded article of manufacture comprised of polycarbonate to accumulate static charges which comprises preparing a polycarbonate which incorporates end groups of the formula

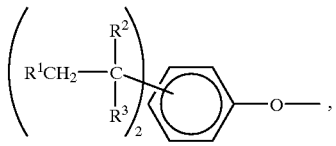

wherein each $R^1$ is hydrogen or a $C_{1-3}$ primary alkyl radical, and each of $R^2$ and $R^3$ is independently a $C_{1-4}$ primary alkyl radical and molding said polycarbonate into a molded article.

8. The method according to claim 7 in which the polycarbonate comprises structural units of the formula

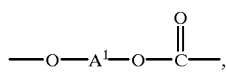

wherein at least about 60% of the total number of $A^1$ groups are aromatic organic radicals and the balance thereof are aliphatic, alicyclic, or aromatic radicals.

9. The method according to claim 8 wherein $A^1$ has the formula $$—A^2—Y—A^3—, \quad (III)$$

wherein each of $A^2$ and $A^3$ is a monocyclic divalent aryl radical and Y is a bridging radical in which one or two atoms separate $A^2$ and $A^3$.

10. The method according to claim 9 wherein each of $A^2$ and $A^3$ is p-phenylene and Y is isopropylidene.

11. The method according to claim 7 wherein $R^1$ is hydrogen and each of $R^2$ and $R^3$ is methyl.

12. The method according to claim 11 wherein the t-alkyl groups are in the 3- and 5-positions.

13. A molded article of manufacture comprising polycarbonate having improved resistance to static charge accumulation prepared according to claim 7.

14. A molded article of manufacture comprising polycarbonate having improved resistance to static charge accumulation prepared according to claim 8.

15. A molded article of manufacture comprising polycarbonate having improved resistance to static charge accumulation prepared according to claim 9.

16. A molded article of manufacture comprising polycarbonate having improved resistance to static charge accumulation prepared according to claim 10.

17. A molded article of manufacture comprising polycarbonate having improved resistance to static charge accumulation prepared according to claim 11.

18. A molded article of manufacture comprising polycarbonate having improved resistance to static charge accumulation prepared according to claim 12.

19. The molded article of manufacture according to claim 13 which is an optical data recording medium.

20. The molded article of manufacture according to claim 19 in which the optical data recording medium is a compact disk.

21. The molded article of manufacture according to claim 13 which is a transparent object.

22. The molded article of manufacture according to claim 13 which is an automotive headlamp lens.

23. The molded article of manufacture according to claim 13 wherein the polycarbonate comprises bisphenol A carbonate structural units.

24. The molded article of manufacture according to claim 22 wherein the polycarbonate comprises 3,5-di-t-butylphenoxy end groups.

25. A polycarbonate comprising bisphenol A repeat units and end groups of the formula

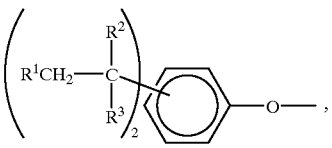

wherein each $R^1$ is hydrogen or a $C_{1-3}$ primary alkyl radical, and each of $R^2$ and $R^3$ is independently a $C_{1-4}$ primary alkyl radical and which when molded into an article of manufacture shows reduced electrostatic charge accumulation relative to the same article molded from polycarbonate s lacking end group s of formula I.

* * * * *